(12) United States Patent
Fressancourt et al.

(10) Patent No.: US 12,463,807 B2
(45) Date of Patent: Nov. 4, 2025

(54) DEVICES AND METHODS FOR PRIVACY-PRESERVING ROUTING IN COMMUNICATION NETWORKS

(71) Applicant: HUAWEI TECHNOLOGIES CO., LTD., Shenzhen (CN)

(72) Inventors: Antoine Fressancourt, Boulogne Billancourt (FR); Luigi Iannone, Boulogne Billancourt (FR); Zhe Lou, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 18/598,853

(22) Filed: Mar. 7, 2024

(65) Prior Publication Data
US 2024/0214196 A1 Jun. 27, 2024

Related U.S. Application Data

(63) Continuation of application No. PCT/EP2021/074533, filed on Sep. 7, 2021.

(51) Int. Cl.
*H04L 9/08* (2006.01)
(52) U.S. Cl.
CPC .................. *H04L 9/088* (2013.01)
(58) Field of Classification Search
CPC . H04L 9/088; H04L 2209/08; H04L 63/0414; H04L 63/0435; H04L 63/1475;
(Continued)

(56) References Cited

U.S. PATENT DOCUMENTS

| | | | | |
|---|---|---|---|---|
| 5,479,514 A | * | 12/1995 | Klonowski | ......... H04L 63/0435 380/47 |
| 6,795,919 B1 | * | 9/2004 | Gibbs | ................ G06Q 20/3821 713/180 |

(Continued)

OTHER PUBLICATIONS

Chen et al., "HORNET: High-speed Onion Routing at the Network Layer," arXiv:1507.05724v3 [cs.CR], total 17 pages (Feb. 8, 2016).
(Continued)

*Primary Examiner* — Techane Gergiso
(74) *Attorney, Agent, or Firm* — Leydig, Voit & Mayer, Ltd.

(57) ABSTRACT

Devices and methods for routing data packets in a communication network from a source node to a destination node via one or more intermediate routing nodes in a privacy-preserving manner are disclosed. The source node is configured to concatenate a first routing vector element including a first bit pattern with an initial routing vector defining a bit string, encrypt the concatenation using a selected first encryption key, and replace a portion of the encrypted initial routing vector at a first position by the encrypted first routing vector element. Moreover, the source node is configured to concatenate a second routing vector element, including a second bit pattern and routing information of the destination node, with the modified routing vector, encrypt the concatenation using a selected second encryption key, and replace a portion of the encrypted modified routing vector at a second position by the encrypted second routing vector element.

20 Claims, 10 Drawing Sheets

(58) Field of Classification Search
CPC ... H04L 63/0464; H04L 45/34; H04L 9/0618; H04L 63/0478; H04L 2212/00; H04L 2209/76; H04L 9/0891
See application file for complete search history.

(56) References Cited

U.S. PATENT DOCUMENTS

| | | | |
|---|---|---|---|
| 2005/0036616 A1* | 2/2005 | Huang | H04L 9/3247 380/255 |
| 2007/0258468 A1* | 11/2007 | Bennett | H04L 63/0464 370/400 |
| 2010/0250930 A1 | 9/2010 | Csaszar et al. | |
| 2017/0238197 A1* | 8/2017 | Baroudi | H04W 40/28 370/225 |

OTHER PUBLICATIONS

Chen et al., "PHI: Path-Hidden Lightweight Anonymity Protocol at Network Layer," ETH Library, Proceedings on Privacy Enhancing Technologies, total 19 pages (2017).

Danezis et al., "Sphinx: A Compact and Provably Secure Mix Format," 2009 30th IEEE Symposium on Security and Privacy, total 14 pages, Institute of Electrical and Electronics Engineers, New York, New York (2009).

* cited by examiner

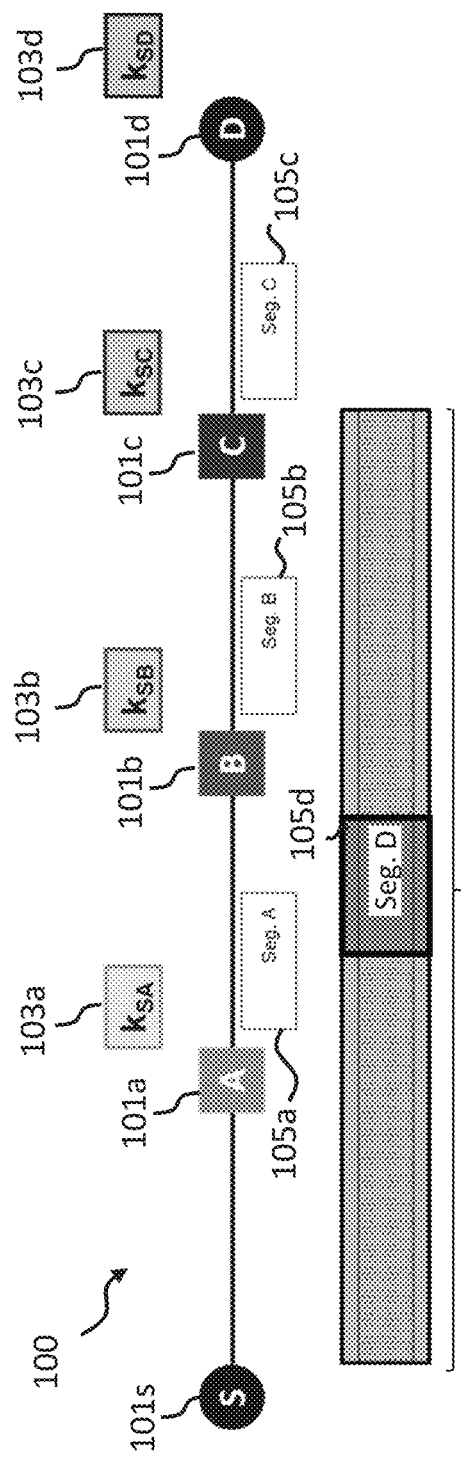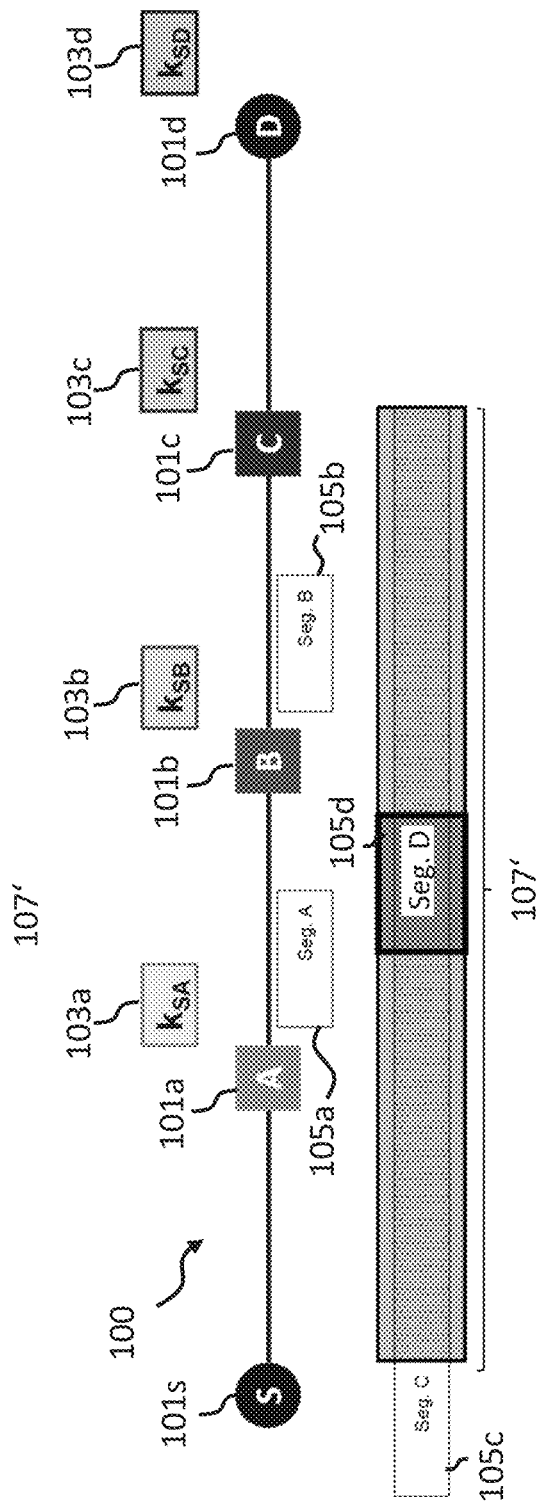
Fig. 3a
Fig. 3b

DEVICES AND METHODS FOR PRIVACY-PRESERVING ROUTING IN COMMUNICATION NETWORKS

CROSS-REFERENCE TO RELATED APPLICATIONS

This application is a continuation of International Application No. PCT/EP2021/074533, filed on Sep. 7, 2021, which is hereby incorporated by reference in its entirety.

TECHNICAL FIELD

The present disclosure relates to communication networks in general. The present disclosure describes devices and methods for routing data packets in a communication network from a source network node to a destination network node in a privacy-preserving manner.

BACKGROUND

Privacy-preserving network protocols for routing in a communication network have been developed using two main approaches, namely a first approach using a trusted third party to break the relationship between the sender and the receiver, or a second approach using a source routing system in which the privacy of the path described by the source node and taken by the packet in the communication network is protected using cryptographic mechanisms.

In the second approach, the source node determines a path to be taken by the packet it sends to the destination node and includes a description of this path in the packets it sends to the destination node. In order to protect the privacy of the source node and the destination node, it should be impossible for an intermediate routing node along the path to determine what the full path taken by the packets in the communication network is. Rather an intermediate routing node along the path should only be able to determine where the packet comes from (i.e. the previous hop along the path), and where it should send the packet to (i.e. the next hop along the path). To allow the communication between the source node and the destination node to be perfectly private, those intermediate routing nodes, moreover, should not be able to determine the path's length, nor to use any information carried by the packet to correlate packets belonging to the same network flow together.

In light of the above, there is a need for improved devices and methods for routing data packets in a communication network from a source node to a destination node via one or more intermediate routing node in a privacy-preserving manner.

SUMMARY

The present disclosure describes improved devices and methods for routing data packets in a communication network from a source node to a destination node via one or more intermediate routing nodes in a privacy-preserving manner.

The embodiments of the present disclosure are achieved by the features of the independent claims and further embodiments and/or implementations are included in the dependent claims, the description, and the figures.

Generally, embodiments disclosed herein allow a source node to encode a path in such a way as to protect information about the path from a rogue observer, while allowing intermediate nodes along the path to decode and lookup routing information they need in a highly efficient fashion. In embodiments disclosed herein this may be implemented in two main stages. In a first stage, public key cryptography may be used by the source node to exchange key material with the intermediate routing nodes forming the path to the destination node. In a second stage, the source node may use this shared key material to build a privacy-protected source routing vector comprising for each of the intermediate routing nodes and the destination node a routing element. This routing vector may have a fixed length and is designed to prevent a given intermediate routing node to derive its position along the path to prevent attacks based on a knowledge of the network topology. Symmetric key cryptography may be used to sequentially encode and/or decode the information carried by the routing elements contained within the routing vector.

According to a first aspect a source node is provided for transmitting a data packet to a destination node via one or more intermediate nodes, including a first intermediate node, of a communication network. The communication network may be an internet protocol (IP)-based communication network.

The source node comprises a processing circuitry and a communication interface. The processing circuitry is configured to concatenate a first routing vector element including a first bit pattern agreed between the source node and the destination node with an initial routing vector comprising a bit string, to encrypt the concatenation of the first routing vector element and the initial routing vector using a selected first encryption key of a plurality of first candidate encryption keys agreed between the source node and the destination node based on a key derivation mechanism and to replace a portion of the encrypted initial routing vector at a first position of the encrypted initial routing vector by the encrypted first routing vector element for obtaining an encrypted first modified routing vector having the same length as the bit string.

In an embodiment, the processing circuitry is configured to concatenate a second routing vector element, including a second bit pattern agreed between the source node and the first intermediate node and routing information, e.g. an address or an identifier of the destination node, with the first modified routing vector, encrypt the concatenation of the second routing vector element and the first modified routing vector using a selected second encryption key of a plurality of second candidate encryption keys agreed between the source node and the first intermediate node, and replace a portion of the encrypted first modified routing vector at a second position of the encrypted first modified routing vector by the encrypted second routing vector element for obtaining an encrypted second modified routing vector having the same length as the bit string.

The communication interface is configured to transmit the data packet including the encrypted second modified routing vector towards the first intermediate node.

In an exemplary embodiment, the first position of the encrypted initial routing vector and the second position of the encrypted first modified routing vector are random positions selected by the processing circuitry based on a pseudo-random permutation.

In an exemplary embodiment, the bit string of the initial routing vector is a random bit string of fixed length.

In an exemplary embodiment, the second routing vector element further includes encrypted information about the first position of the encrypted first routing vector element within the encrypted first modified routing vector.

In an exemplary embodiment, the data packet further comprises information about the second position of the encrypted second routing vector element within the encrypted second modified routing vector.

In an exemplary embodiment, the processing circuitry is further configured to concatenate a third routing vector element, including a third bit pattern agreed between the source node and a second intermediate node and routing information, e.g. an address or an identifier of the first intermediate node, with the second modified routing vector, encrypt the concatenation of the third routing vector element and the second modified routing vector using a selected third encryption key of a plurality of third candidate encryption keys agreed between the source node and the second intermediate node, and replace a portion of the encrypted second modified routing vector at a third random position of the encrypted second modified routing vector by the encrypted third routing vector element for obtaining an encrypted third modified routing vector having the same length as the bit string. The communication interface is further configured to transmit the data packet including the encrypted third modified routing vector towards the second intermediate node of the one or more intermediate nodes of the communication network.

In an exemplary embodiment, the processing circuitry is configured to concatenate the first routing vector element with the initial routing vector by prepending the first routing vector element to the initial routing vector and/or the processing circuitry is configured to concatenate the second routing vector element with the first modified routing vector by prepending the second routing vector element to the first modified routing vector.

In an exemplary embodiment, the processing circuitry is further configured to encrypt a data packet payload using the selected first encryption key and to further encrypt the encrypted data packet payload using the selected second encryption key.

In an exemplary embodiment, the processing circuitry is configured to use a symmetric key encryption scheme for encrypting and decrypting.

In an exemplary embodiment, the symmetric key encryption scheme comprises a block cipher, such as a large block cipher.

In an exemplary embodiment, the symmetric key encryption scheme is based on an exclusive OR (XOR) operation.

In an exemplary embodiment, the processing circuitry is configured to generate the first candidate encryption keys using a first key derivation scheme and the second candidate encryption keys using a second key derivation scheme.

In an exemplary embodiment, the processing circuitry is further configured to determine the first intermediate node in the communication network using a source routing scheme.

In an exemplary embodiment, the first routing vector element further comprises routing information of the destination node.

According to a second aspect a method is provided for transmitting a data packet from a source node to a destination node via one or more intermediate nodes, including a first intermediate node, of a communication network, wherein the method comprises the steps of:
concatenating a first routing vector element including a first bit pattern agreed between the source node and the destination node with an initial routing vector comprising a bit string,
encrypting the concatenation of the first routing vector element and the initial routing vector using a selected first encryption key of a plurality of first candidate encryption keys agreed between the source node and the destination node based on a key derivation mechanism,
replacing a portion of the encrypted initial routing vector at a first position of the encrypted initial routing vector by the encrypted first routing vector element for obtaining an encrypted first modified routing vector having the same length as the bit string;
concatenating a second routing vector element, including a second bit pattern agreed between the source node and the first intermediate node and routing information, e.g. an address or an identifier of the destination node, with the first modified routing vector;
encrypting the concatenation of the second routing vector element and the first modified routing vector using a selected second encryption key of a plurality of second candidate encryption keys agreed between the source node and the first intermediate node;
replacing a portion of the encrypted first modified routing vector at a second position of the encrypted first modified routing vector by the encrypted second routing vector element for obtaining an encrypted second modified routing vector having the same length as the bit string; and
transmitting the data packet including the encrypted second modified routing vector towards the first intermediate node.

The method according to the second aspect can be performed by the source node according to the first aspect. Further features of the method according to the second aspect result directly from the functionality of the source node according to the first aspect as well as its different implementation forms and embodiments described above and below.

According to a third aspect an intermediate node is provided for routing a data packet from a source node to a destination node of a communication network. The intermediate routing node comprises a communication interface configured to receive the data packet from an upstream node of the communication network. The intermediate node comprises a processing circuitry configured to: extract from an encrypted routing vector an encrypted routing vector element, including an encrypted bit pattern and encrypted routing information, e.g. an address or an identifier, of a downstream node; select based on the encrypted bit pattern an encryption key of a plurality of candidate encryption keys; and decrypt the encrypted routing information using the selected key for obtaining the routing information of the downstream node. The communication interface is further configured to send the data packet to the downstream node based on the routing information of the downstream node.

In an exemplary embodiment, the processing circuitry is configured to use a symmetric key encryption scheme for encrypting and decrypting.

In an exemplary embodiment, the symmetric key encryption scheme comprises a block cipher.

In an exemplary embodiment, the symmetric key encryption scheme is based on an XOR operation.

In an exemplary embodiment, the upstream node is the source node or a further intermediate node.

In an exemplary embodiment, the downstream node is the destination node or a further intermediate node.

In an exemplary embodiment, the processing circuitry is further configured to re-encrypt the routing vector element using the selected key.

According to a fourth aspect a method for routing a data packet from a source node via an intermediate node to a destination node of a communication network is provided. The method according to the fourth aspect comprises the steps of:

receiving the data packet from an upstream node of the communication network;

extracting from an encrypted routing vector an encrypted routing vector element, including an encrypted bit pattern and encrypted routing information, e.g. an address or an identifier of a downstream node;

selecting based on the encrypted bit pattern an encryption key of a plurality of candidate encryption keys;

decrypting the encrypted routing information using the selected key for obtaining the routing information of the downstream node; and sending the data packet to the downstream node based on the routing information of the downstream node.

The method according to the fourth aspect can be performed by the intermediate node according to the third aspect. Features of the method according to the fourth aspect result directly from the functionality of the intermediate node according to the third aspect as well as its different implementation forms and embodiments described above and below.

According to a fifth aspect a computer program product is provided, comprising a computer-readable storage medium for storing program code which causes a computer or a processor to perform the method according to the second aspect or the method according to the fourth aspect, when the program code is executed by the computer or the processor.

Details of one or more embodiments are set forth in the accompanying drawings and the description below.

BRIEF DESCRIPTION OF THE DRAWINGS

In the following, embodiments of the present disclosure are described in more detail with reference to the attached figures and drawings, in which:

FIGS. 3a-d show schematic diagrams illustrating further steps of generating a routing vector comprising a plurality of routing elements by a source node according to an embodiment;

In the following, identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
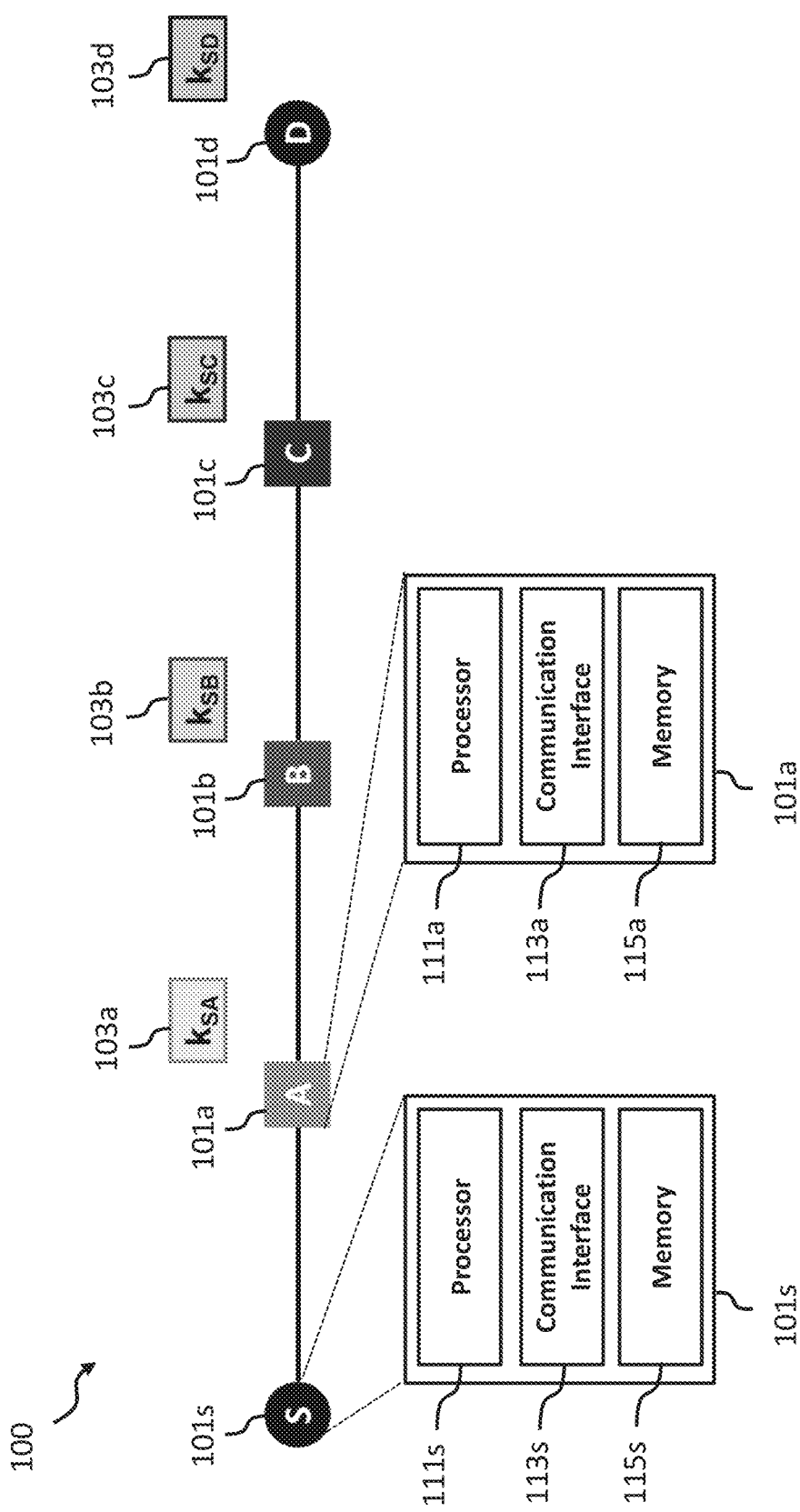
FIG. 1 is a schematic diagram illustrating a communication network with a source node for transmitting data packets along a path via a plurality of intermediate routing nodes to a destination node, in accordance with an embodiment.

FIG. 1 is a schematic diagram of a communication network 100 with a plurality of intermediate nodes 101a-c for routing data packets along a communication path from a source node 101s to a destination node 101d of the communication network 100. In an embodiment, the communication network 100 may be an IP-based communication network 100 and the plurality of intermediate nodes 101a-c may comprise one or more routers 101a-c.

As illustrated in FIG. 1, the source node 101s comprises a processing circuitry 111s and a communication interface 113s. The processing circuitry 111s of the source node 101s may be implemented in hardware and/or software. The hardware may comprise digital circuitry, or both analog and digital circuitry. Digital circuitry may comprise components such as application-specific integrated circuits (ASICs), field-programmable arrays (FPGAs), digital signal processors (DSPs), or general-purpose processors. The communication interface 113s may be a wired and/or wireless communication interface configured to exchange data packets, e.g. IP data packets with the other nodes of the communication network 100. As illustrated in FIG. 1, the source node 101s may further comprise a non-transitory memory 115s configured to store data and executable program code which, when executed by the processing circuitry 111s causes the source node 101s to perform the functions, operations and methods described herein.

Likewise, the exemplary intermediate routing node 101a comprises a processing circuitry 111a and a communication interface 113a. The processing circuitry 111a of the exemplary intermediate routing node 101a may be implemented in hardware and/or software. The hardware may comprise digital circuitry, or both analog and digital circuitry. Digital circuitry may comprise components such as application-specific integrated circuits (ASICs), field-programmable arrays (FPGAs), digital signal processors (DSPs), or general-purpose processors. The communication interface 113a may be a wired and/or wireless communication interface configured to exchange data packets, e.g. IP data packets with the other nodes of the communication network 100. As illustrated in FIG. 1, the exemplary intermediate routing node 101a may further comprise a non-transitory memory 115a configured to store data and executable program code which, when executed by the processing circuitry 111a causes the exemplary intermediate routing node 101a to perform the functions, operations and methods described herein. The other intermediate routing nodes 101b and 101c may have the same or a similar setup and/or configuration as the intermediate routing node 101a.

As will be described in more detail below under further reference to FIGS. 2a-d and 3a-d, the processing circuitry 111s of the source node 101s is configured to concatenate a first routing vector element 105d including a first bit pattern agreed between the source node 101s and the destination node 101d with an initial routing vector 107 comprising a bit string, encrypt the concatenation of the first routing vector element 105d and the initial routing vector 107 using a selected first encryption key 103d of a plurality of first candidate encryption keys, and replace a portion of the encrypted initial routing vector 107 at a first position of the encrypted initial routing vector 107 by the encrypted first routing vector element 105d for obtaining a first modified routing vector 107'.

Moreover, the processing circuitry 111s of the source node 101s is configured to concatenate a second routing vector element 105c, including a second bit pattern agreed between the source node 101a and the first intermediate node 101c upstream of the destination node 101d as well as routing information of the destination node 101d, with the first modified routing vector 107', encrypt the concatenation of the second routing vector element 105c and the first modified routing vector 107' using a selected second encryption key 103c of a plurality of second candidate encryption keys, and replace a portion of the encrypted first modified routing vector 107' at a second position of the encrypted first modified routing vector 107' by the encrypted second routing vector element 105c for obtaining a second modified routing vector 107". The same or similar processing steps may be performed for the other intermediate routing nodes 101b and 101a. The communication interface 113s of the source node 101s is configured to transmit the data packet to the first intermediate routing node 101a downstream of the source node 101s.

The communication interface 113a of the exemplary intermediate routing node 101a is configured to receive the data packet from the source node 101s. The processing circuitry 111a of the exemplary intermediate routing node 101a is configured to extract from the encrypted routing vector 107" the encrypted routing vector element 105a, including an encrypted bit pattern and encrypted routing information of the next downstream node, i.e. the intermediate routing node 101b, select based on the encrypted bit pattern an encryption key 103a of a plurality of candidate encryption keys, and decrypt the encrypted routing information using the selected key 103a for obtaining the routing information of the next downstream node, i.e. the intermediate routing node 101b. The communication interface 113a of the exemplary intermediate routing node 101a is further configured to send the data packet to the next downstream node, i.e. the intermediate routing node 101b based on the extracted routing information of the intermediate routing node 101b.

As will be described in more detail below, embodiments disclosed herein may make use of one or more of four elements for providing advantageous privacy protection properties.

According to embodiments disclosed herein a first element includes that the information carried by a routing vector 107 containing a plurality of routing vector elements (or short routing elements) 105a-d is protected using a respective shared symmetric key. Advantageously, the use of symmetric key cryptography allows the intermediate routing nodes 101a-c to operate at line rate. A respective set of shared candidate keys is negotiated between the source node 101a and each intermediate node 101a-c along the path. This negotiation of the candidate keys may be based on public key cryptography. Once this shared key is agreed upon, a set of temporary keys can be derived from this master key to avoid the use of public key cryptography while ensuring a key rotation that prevents packets to be associated in a same data flow.

According to embodiments disclosed herein a second element includes that the routing vector 107 containing the routing elements may have a fixed size as the corresponding data packet travels along the path from the source node 101s to the destination node 101d. This prevents an external observer from intercepting a data packet to derive any hints about the source node 101s and the destination node 101d based on the length of the routing vector 107.

According to embodiments disclosed herein a third element includes that the position of the routing element for a given intermediate node 101a-c may be randomly permuted within the routing vector 107. By doing this the respective intermediate node 101a-c cannot infer based on the position of its routing element within the routing vector 107 any information about how many hops it is away from the source node 101s or the destination node 101d. This may prevent deanonymization attacks using topological information to diminish the anonymity set's size for either the source node 101s or the destination node 101d.

According to embodiments disclosed herein a fourth element includes that the routing vector 107 is generated and processed so that it can be processed at each intermediate node 101a-c without having to perform numerous rewrite operations.

In an embodiment, the relevant part of the routing vector may not be the first bytes dedicated to carrying a first routing element, but due to the random permutation a different set of bytes, whose position is defined a header element of the data packet. In an embodiment, the symmetric encryption operation for encrypting/decrypting the respective routing element of the routing vector at an intermediate node 101a-c may be an XOR operation with the respective selected candidate key 103a-d. This processing is very quick and may ensure that the data packet can be processed at line rate. In an embodiment, the encryption operation may be performed after prepending the routing vector 107 with the routing element 150a-c of an intermediate routing node 101a-d and then using the selected symmetric key established with that node to encrypt the concatenation. During a further step, the prepended routing element is cut and put in the randomly selected position within the routing vector 107. As will be appreciated, this "encrypt, then cut and paste"-approach for generating the routing vector 107 avoids having information in the clear during the packet relaying phase, while avoiding the need to rewrite the whole routing vector 107. This allows preventing packet correlation attacks allowing an attacker to associate packets to a specific flow of data packets.

By combing one or more of the four elements described above, embodiments disclosed herein may protect the privacy of a path through the communication network 100 at the network layer without having to involve a trusted third party. Source routing and recursive routing vector encryption may be used so that a given intermediate node 101a-c can only access routing information that is relevant to the respective node, and an external observer is unable to correlate packets belonging to the same flow together.

The generation of the routing vector 107 by the source node 101s and the relaying of the routing vector 107 by the intermediate routing nodes 101a-c to the destination node 101d for an exemplary path shown in FIG. 1 is described in more detail below.

In an embodiment, the routing vector 107 may have a fixed size in that the length, i.e. the number of bits/bytes of the routing vector 107 stays constant as the data packet containing the routing vector 107 travels from the source node 101a via the intermediate routing nodes 101a-c to the destination node 101d. In an embodiment, the routing vector 107 may contain MAX_PATH_LENGTH elements of size SEGMENT_LENGTH bytes containing the routing information that will be used by a given intermediate node 101a-c for routing the data packet to the destination node 101d.

The source node 101s has exchanged shared key material with the intermediate nodes 101a-c and the destination node 101d. In an embodiment, this shared key material may comprise a respective shared master key as well as a respective synchronized key derivation scheme and its associated parameters. In an embodiment, for encrypting/decrypting the source node 101s, the intermediate routing nodes 101a-c, and the destination node 101d may use a large block symmetric key encryption scheme Enc( . . . ) such that Enc(Enc(p, $k_{SX}$), $k_{SX}$)=p.

FIGS. 2a-d and 3a-d illustrate different stages of the generation of the data packet including the routing vector 107 by the source node 101s according to an embodiment. In a preliminary stage, the source node 101s may determine based on a source routing scheme a path to the destination node 101d through the communication network 100, which in the exemplary embodiment shown in FIGS. 1, 2a-d and 3a-d includes the intermediary routing nodes 101a-c. For encoding information about this path in the data packet the processing circuitry 111s of the source node 101s obtains the addresses for the intermediate routing nodes 101a-c and the destination node 101d along this path, i.e., A_addr, B_addr, C_addr and D_addr. Thereafter, the processing circuitry 111s of the source node 101s may initialize the routing vector 107 by generating a random byte string of length MAX_PATH_LENGTH×SEGMENT_LENGTH. As will be appreciated, for this embodiment the initialized routing vector 107 defines MAX_PATH_LENGTH slots for the routing elements 105a-d, wherein each slot, i.e. routing element 105a-d comprises SEGMENT_LENGTH bits. In an embodiment, the processing circuitry 111s of the source node 101s is configured to randomize the location of the plurality of routing elements 105a-d within the routing vector 107 based on a pseudo-random permutation over the MAX_PATH_LENGTH slots available of the routing vector 107. As will be described in more detail below, in case the next downstream node is another intermediate routing node each routing element 105a-d (referred to as "Seg. A", "Seg. B", "Seg. C" and "Seg. D" in FIG. 2) may comprise in addition to the respective encrypted bit pattern information, e.g., an address of the next downstream intermediate node 101a-c as well as a pointer to the location of the routing element 105a-d of the next downstream intermediate node 101a-c within the routing vector 107. In an embodiment, because the destination node 101s is the last node along the path the routing element 105d for the destination node 101d ("Seg. D" in FIG. 2) may only comprise the encrypted bit pattern for identifying the encryption key. In a further embodiment, the routing element 105d for the destination node 101d may further comprise an address of the destination node 101d or a default address indicative of the destination node 101d being the destination of the data packet.

Figure 2A:
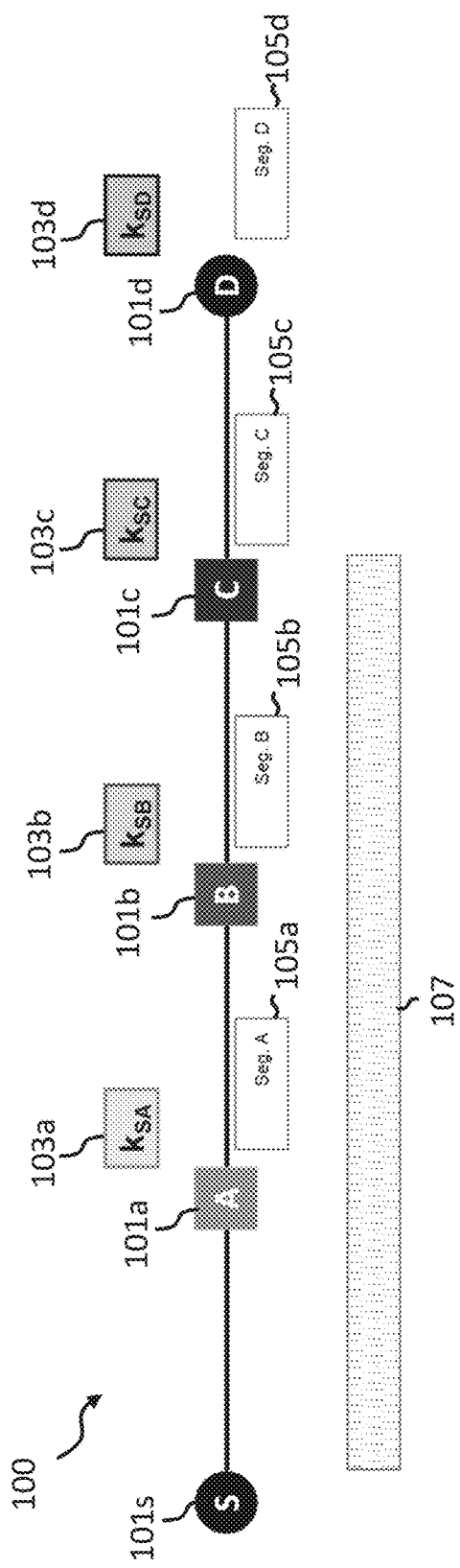
FIGS. 2a-d show schematic diagrams illustrating steps of generating a routing vector comprising a plurality of routing elements by a source node according to an embodiment.

Having performed the operations described above the following elements are available to source node 101s: a list of the intermediate routing nodes 101a-c defining the path to the destination node 101d, the routing elements 105a-d for the intermediate routing nodes 101a-c and the destination node 101d as well as the information about the random locations of the respective routing elements 105a-d within the routing vector 107. Based on this information the processing circuitry 111s of the source node 101s may generate the complete routing vector 107 starting with the routing element 105d for the destination node 101d, as illustrated in FIG. 2a.

Figure 2B:
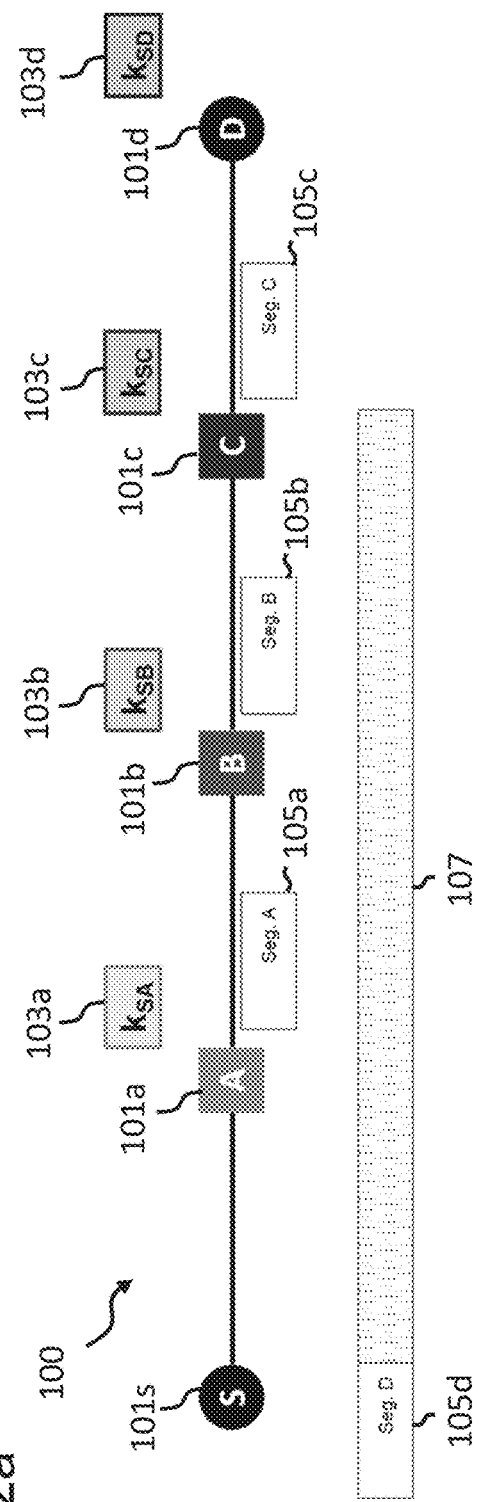

As illustrated in FIG. 2b, the processing circuitry 111s of the source node 101s prepends the routing element 105d (i.e. "Seg. D") to the initial routing vector 107, e.g. the randomized bit string 107. In a next stage, the processing circuitry 111s of the source node 101s obtains an encryption key based directly or indirectly on the shared key $k_{SD}$ between the source node 101s and the destination node 101d. In an embodiment, the processing circuitry 111s of the source node 101s may select the encryption key from a plurality of encryption key candidates that are based on the shared key $k_{SD}$. In an embodiment, the source node 101s and the destination node 101d may use the same key derivation scheme for generating the plurality of encryption key candidates based on the shared key $k_{SD}$. In an embodiment, the encryption key may have the length (MAX_PATH_LENGTH+1)×SEGMENT_LENGTH, i.e. the same length (number of bits) as the concatenation of the routing element 105d (i.e. "Seg. D") with the initial routing vector 107, e.g. the randomized bit string 107. In an embodiment, the processing circuitry 111s of the source node 101s may encrypt the concatenation of the routing element 105d (i.e. "Seg. D") with the initial routing vector 107 by performing an XOR operation of the selected encryption key with the concatenation of the routing element 105d (i.e. "Seg. D") with the initial routing vector 107. In an embodiment, the processing circuitry 111s of the source node 101s may use for the encryption a block cipher with a large block size, such as Lioness which builds on top of advanced encryption standard (AES)-128. In this block cipher, the encryption is a XOR operation with a large vector built using the selected key. As will be appreciated, for such a cipher based on an XOR operation, encryption and decryption are symmetric, and the position of the encrypted elements plays a role in the encryption's correctness.

Figure 2C:
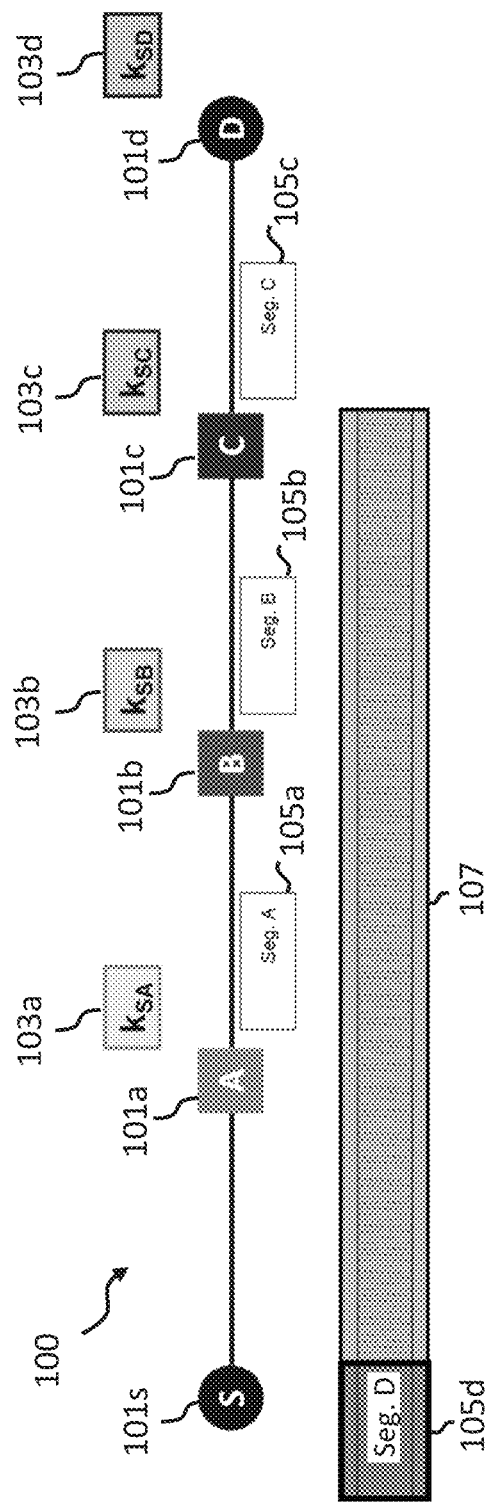
Figure 2D:
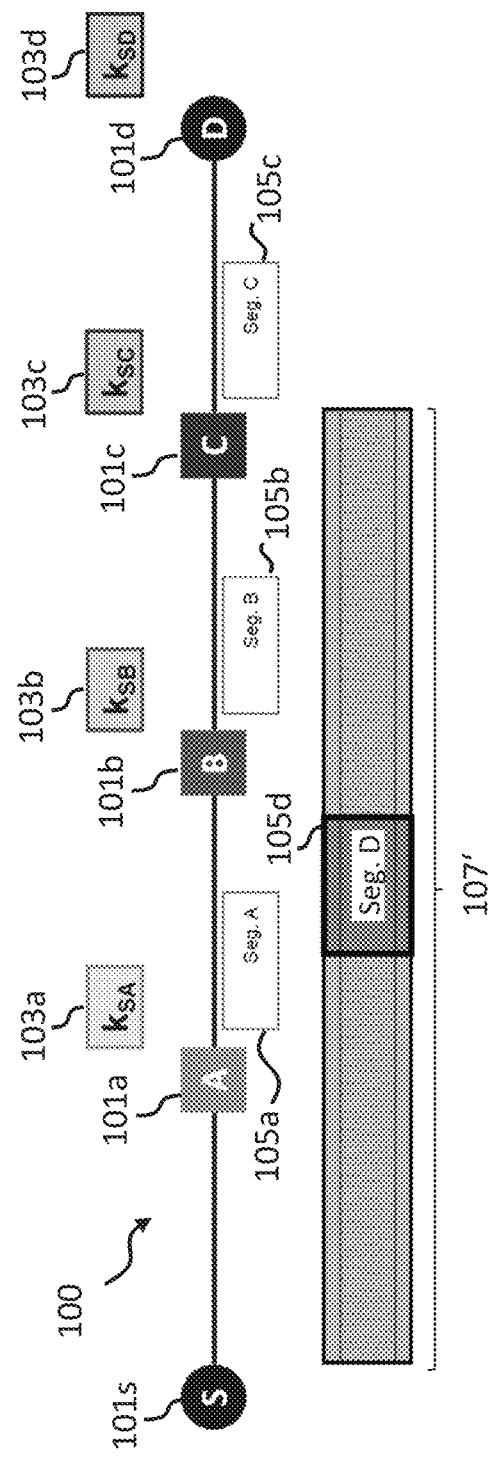
Figure 3C:
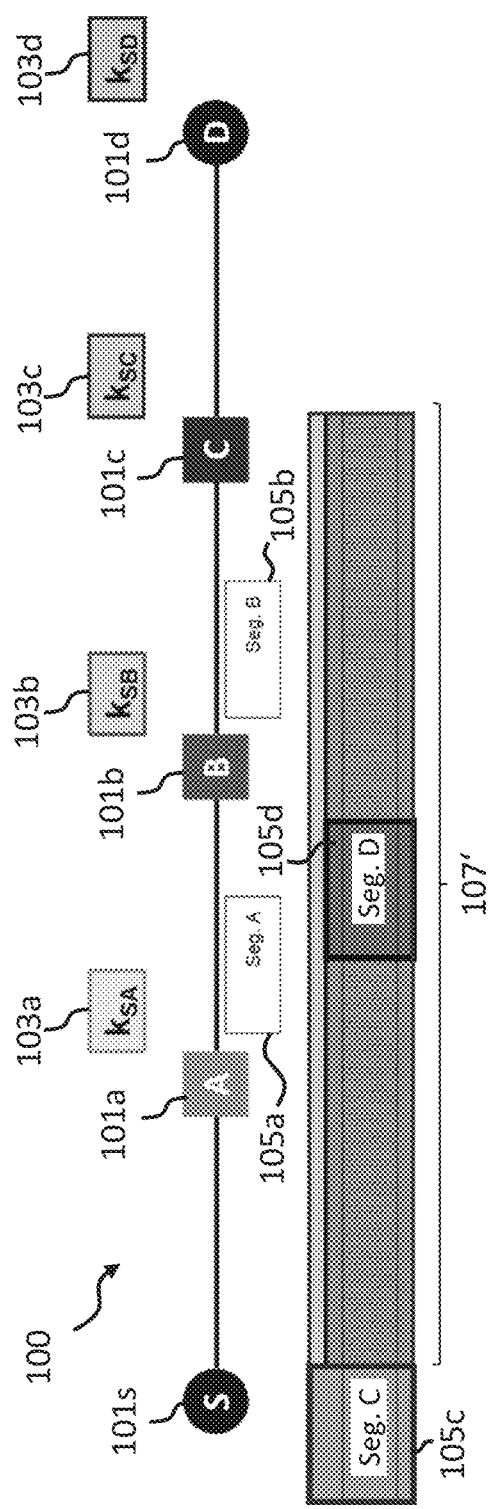
Figure 3D:
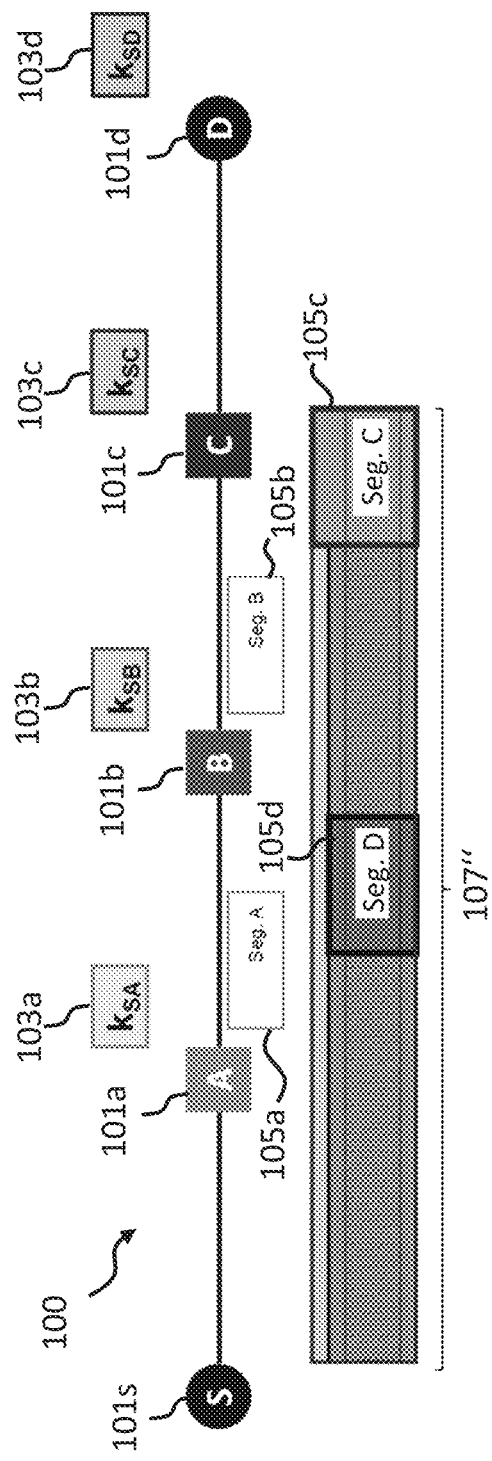

After the concatenation of the routing element 105d (i.e. "Seg. D") with the initial routing vector 107 of length (MAX_PATH_LENGTH+1)×SEGMENT_LENGTH has been encrypted, the processing circuitry 111s of the source node 101s is configured to cut the encrypted routing element 105d (i.e. "Seg. D"), i.e., the first SEGMENT_LENGTH bits of the encrypted string and paste this byte string at the location within the routing vector 107 predetermined by the random permutation, as illustrated in FIGS. 2c and 2d.

As will be appreciated from FIGS. 3a-d, the same processing steps are performed by the processing circuitry 111s of the source node 101s for including the routing elements of the intermediate routing nodes 101a-c. Thus, the source node 101s continues the process described above with respect to the destination node 101d first for the first intermediate node upstream of the destination node 101d, namely intermediate node 101c, then for intermediate node 101b and finally for intermediate node 101a. As a result of this sequential generation process implemented by the processing circuitry 111s of the source node 101s the sequentially-encrypted routing elements vector 107" illustrated in FIG. 4 is obtained, which is sent via the communication interface 113s of the source node 101s to the first downstream intermediate routing node 101a.

Figure 4:
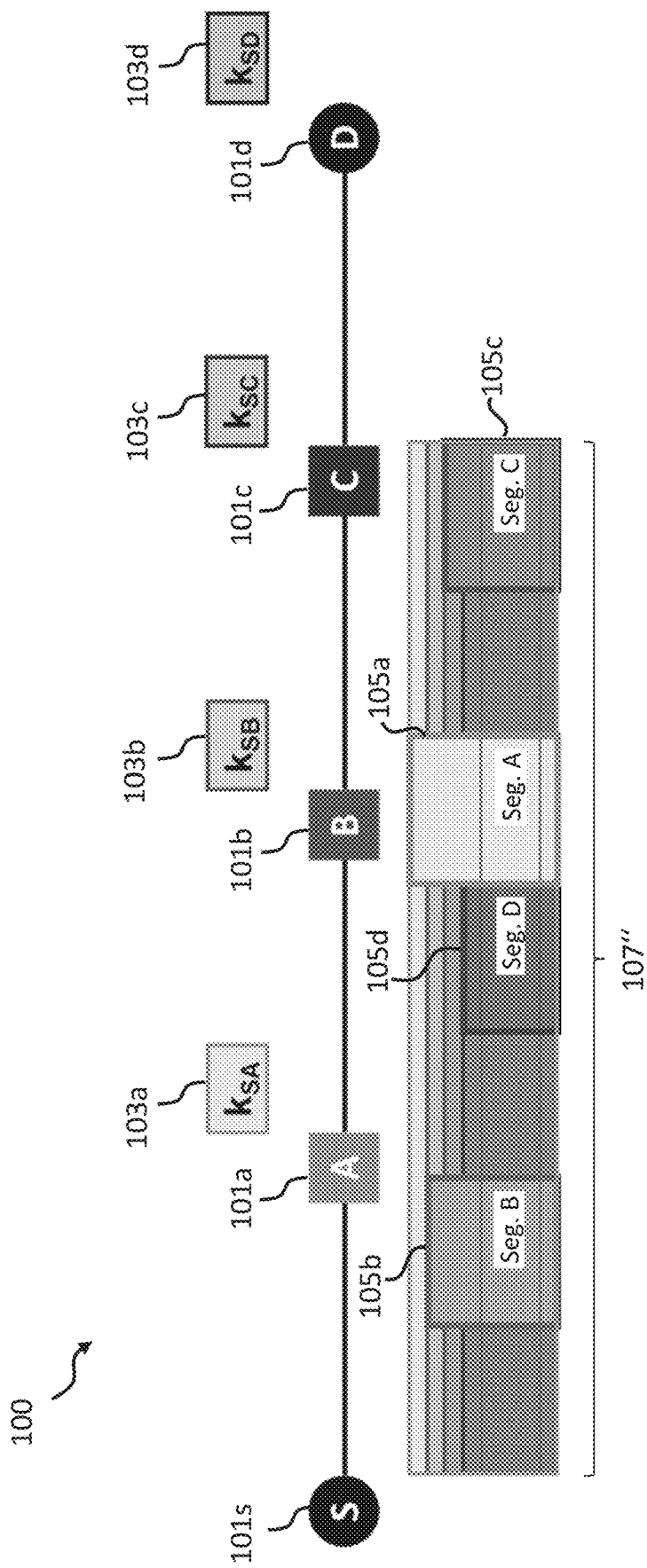
FIG. 4 is a schematic diagram illustrating the routing vector comprising a plurality of routing elements as received by an intermediate routing node according to an embodiment.
Figure 5A:
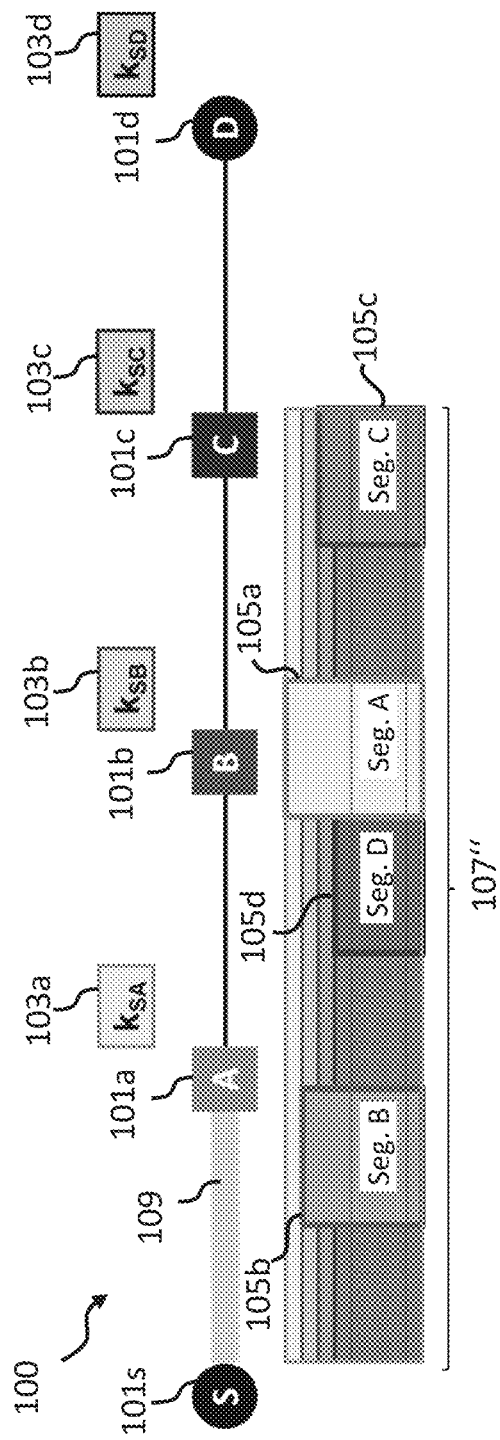
FIGS. 5a-d show schematic diagrams illustrating steps of processing the routing vector of FIG. 4 by an intermediate routing node according to an embodiment.
Figure 5B:
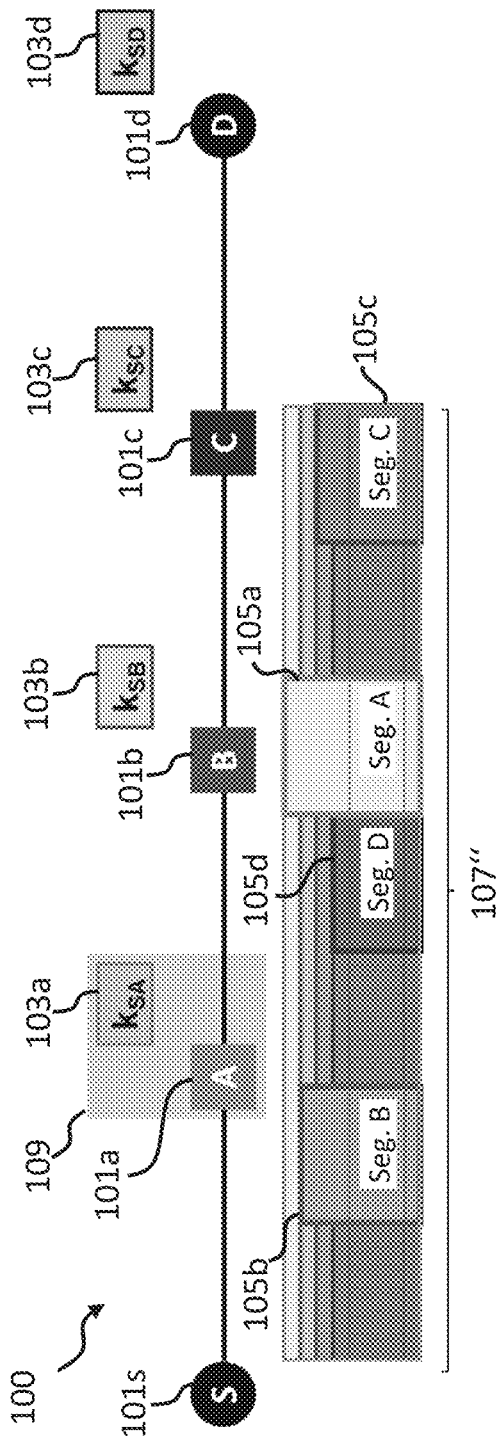
Figure 5C:
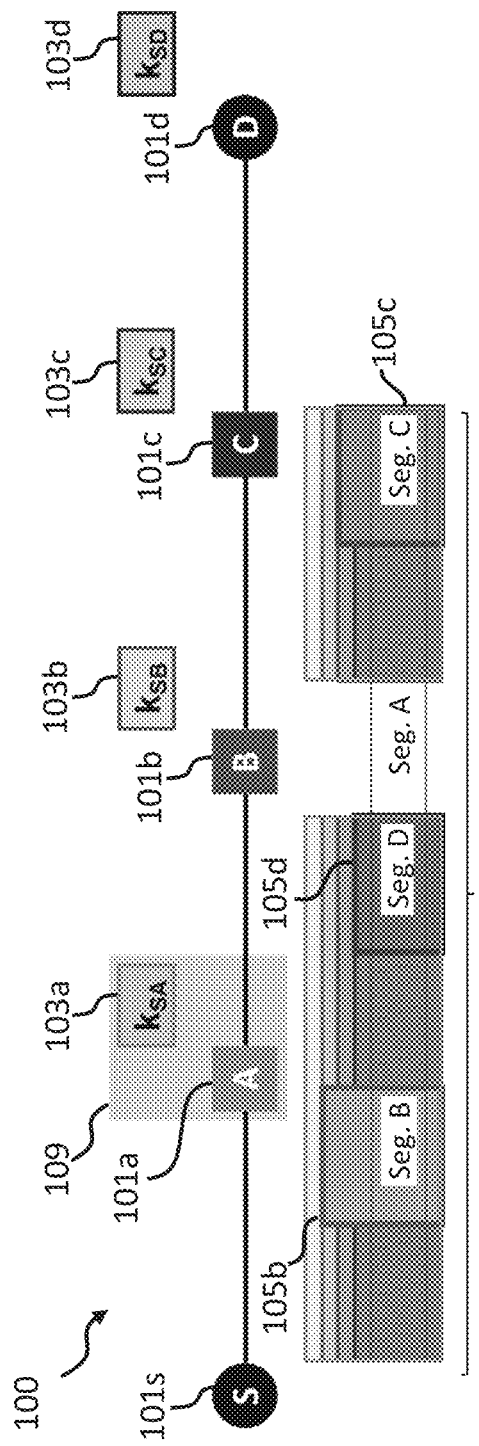
Figure 5D:
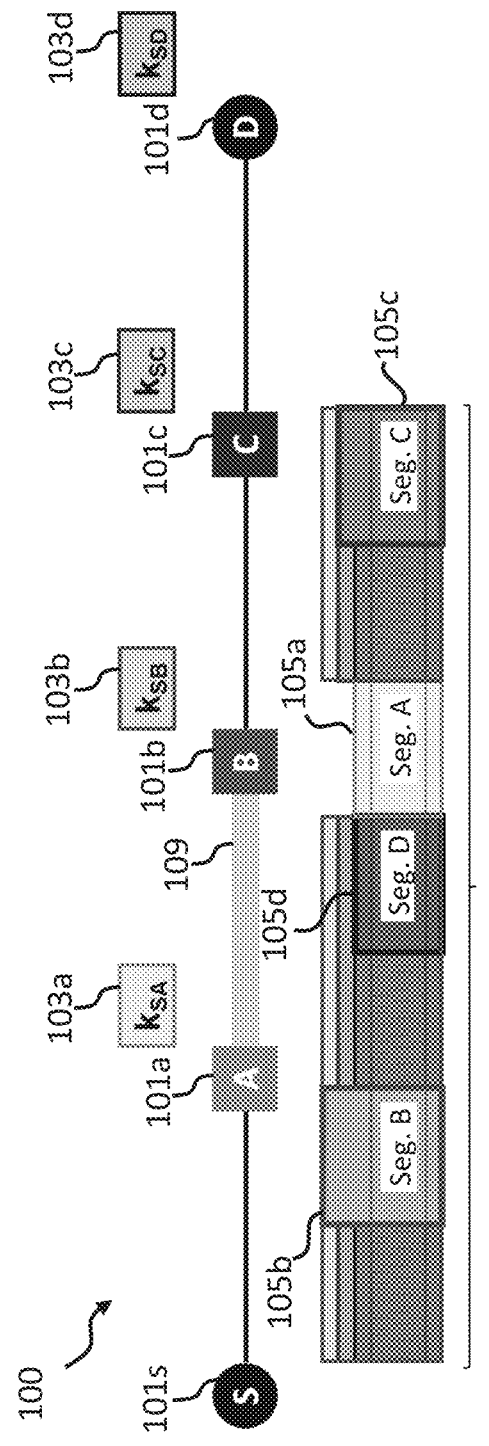

FIGS. 5a-d illustrate in more detail how the data packet shown in FIG. 4 is processed and relayed by the exemplary intermediate routing node 101a. In an embodiment, the header of the data packet carrying the routing elements vector 107" further contains a pointer to the encrypted routing element 105a of the intermediate routing node 101a, i.e. Enc(Seg. A, $k_{SA}$). Based on the encrypted bit pattern included in the encrypted routing element 105a the processing circuitry 111a of the intermediate routing node 101a is configured to determine the key $k_{SA}$ for decrypting the encrypted routing element 105a of the intermediate routing node 101a, i.e. Enc(Seg. A, $k_{SA}$). Once decrypted, the processing circuitry is configured to extract the routing information of the next downstream node from the routing element 105a, e.g. an address of the routing node 101b as well as information about the random location of the routing element 105b of the intermediate routing node 101b within the routing vector 107". In an embodiment, the processing circuitry may be configured to re-encrypt its routing element 105a within the routing vector 107".

In an embodiment, the processing circuitry 111a of the intermediate routing node 101a is configured to generate a key stream of length (MAX_PATH_LENGTH+1)×SEGMENT_LENGTH based on the key $k_{SA}$ and to use the first SEGMENT_LENGTH bits of the key stream to decrypt (for instance by an XOR operation with the key stream) the encrypted routing element 105a, i.e. Enc(Seg. A, $k_{SA}$) and to retrieve the routing information it needs for routing the data packet, namely the address of the next intermediate routing node 101b as well as the pointer to the slot in the routing vector 107" associated with this next node. In an embodiment, the processing circuitry 111a of the intermediate routing node 101a may insert the pointer to the slot in the routing vector 107" associated with the next downstream node, i.e. the intermediate routing node 101b as unencrypted metadata in the header of the data packet. Then the processing circuitry 111a of the intermediate routing node 101a is configured to re-encrypt the whole routing vector 107", for instance, by using the trailing MAX_PATH_LENGTH×SEGMENT_LENGTH bits of the key stream generated on the basis of the key $k_{SA}$. This hides the information contained in the routing element 105a (i.e. Seg. A) and removes the $k_{SA}$ encryption layer from the remaining of the routing vector 107". The such processed data packet is forward to the next downstream intermediate routing node 101b. The key $k_{SA}$ or its derivative can then be deleted in order to prevent it from being retrieved or reused. In a further embodiment, the key $k_{SA}$ may be kept in situations where forward secrecy is not a serious threat.

As will be appreciated, at the intermediate routing nodes 101b and 101c the same steps may be performed as described above in the context of the intermediate routing node 101a. In this way the data packet and the routing vector 107" contained therein is further processed and relayed to the destination node 101d. Like the intermediate routing nodes 101a-c the destination node 101d may be configured to retrieve the routing element 105d from the routing vector 107". In an embodiment, the routing element 105d of the destination node 101d may only comprise the encrypted bit pattern for identifying the encryption key used by the source node 101s for encrypting the packet payload. In an embodiment, the routing element 105d for the destination node 101d may further comprise its own address (or a default address) indicating to the destination node 101d that it is the intended destination of the data packet.

Figure 6:
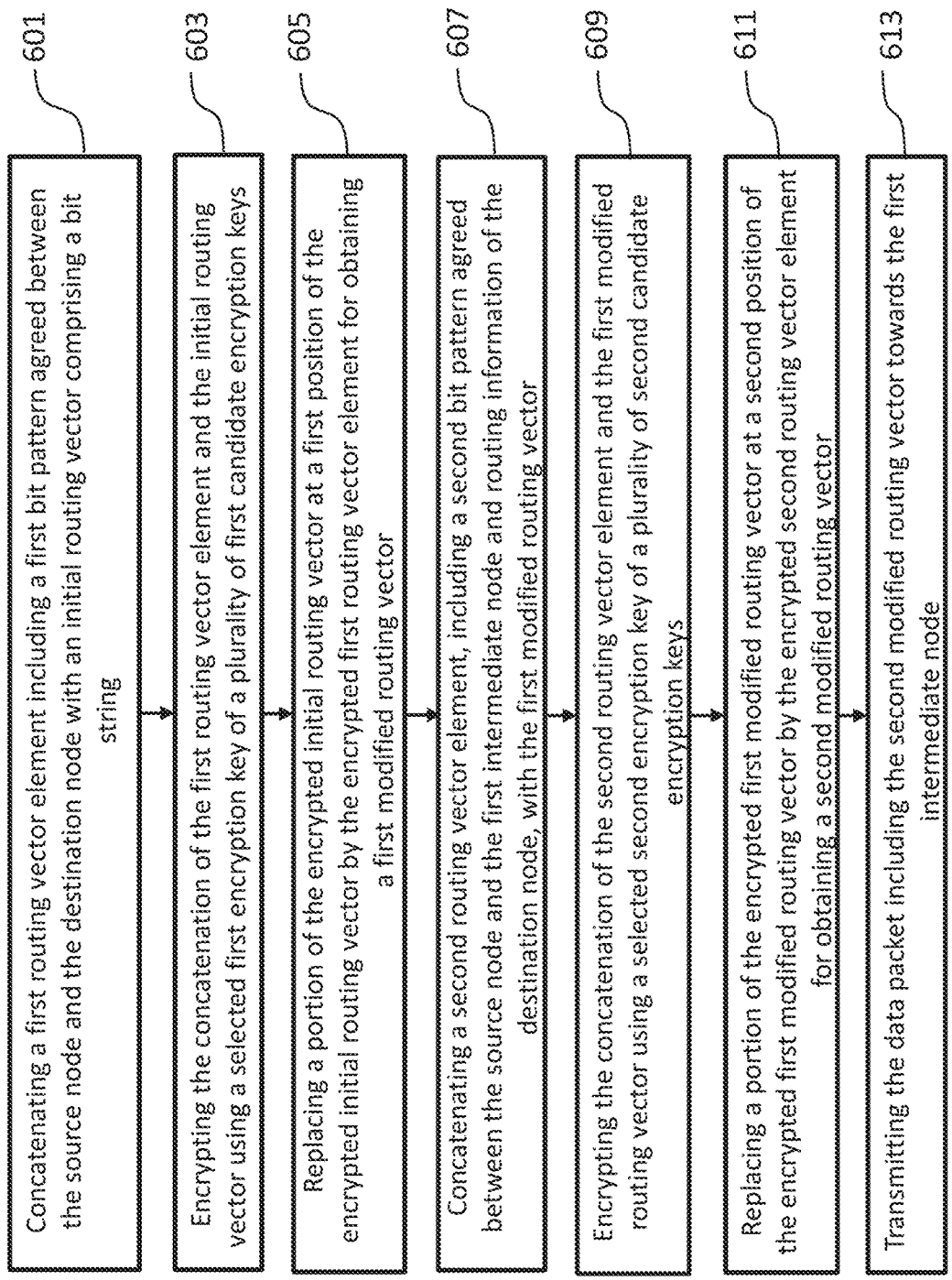
FIG. 6 is a flow diagram illustrating a method for transmitting a data packet according to an embodiment.

FIG. 6 is a flow diagram illustrating a method 600 for transmitting a data packet from a source node to a destination node via one or more intermediate nodes, including a first intermediate node, in a communication network according to an embodiment.

The method 600 comprises a step of concatenating 601 a first routing vector element including a first bit pattern agreed between the source node and the destination node with an initial routing vector comprising a bit string.

The method 600 further comprises a step of encrypting 603 the concatenation of the first routing vector element and the initial routing vector using a selected first encryption key of a plurality of first candidate encryption keys.

The method 600 further comprises a step of replacing 605 a portion of the encrypted initial routing vector at a first position of the encrypted initial routing vector by the encrypted first routing vector element for obtaining a first modified routing vector.

The method 600 further comprises a step of concatenating 607 a second routing vector element, including a second bit pattern agreed between the source node and the first intermediate node and routing information of the destination node, with the first modified routing vector.

The method 600 further comprises a step of encrypting 609 the concatenation of the second routing vector element and the first modified routing vector using a selected second encryption key of a plurality of second candidate encryption keys.

The method 600 further comprises a step of replacing 611 a portion of the encrypted first modified routing vector at a second position of the encrypted first modified routing vector by the encrypted second routing vector element for obtaining a second modified routing vector.

The method 600 further comprises a step of transmitting 613 the data packet including the second modified routing vector towards the first intermediate node.

The method 600 can be performed by the source node 101s according to an embodiment. Thus, further features of the method 600 result directly from the functionality of the source node 101a as well as its different embodiments described above and below.

Figure 7:
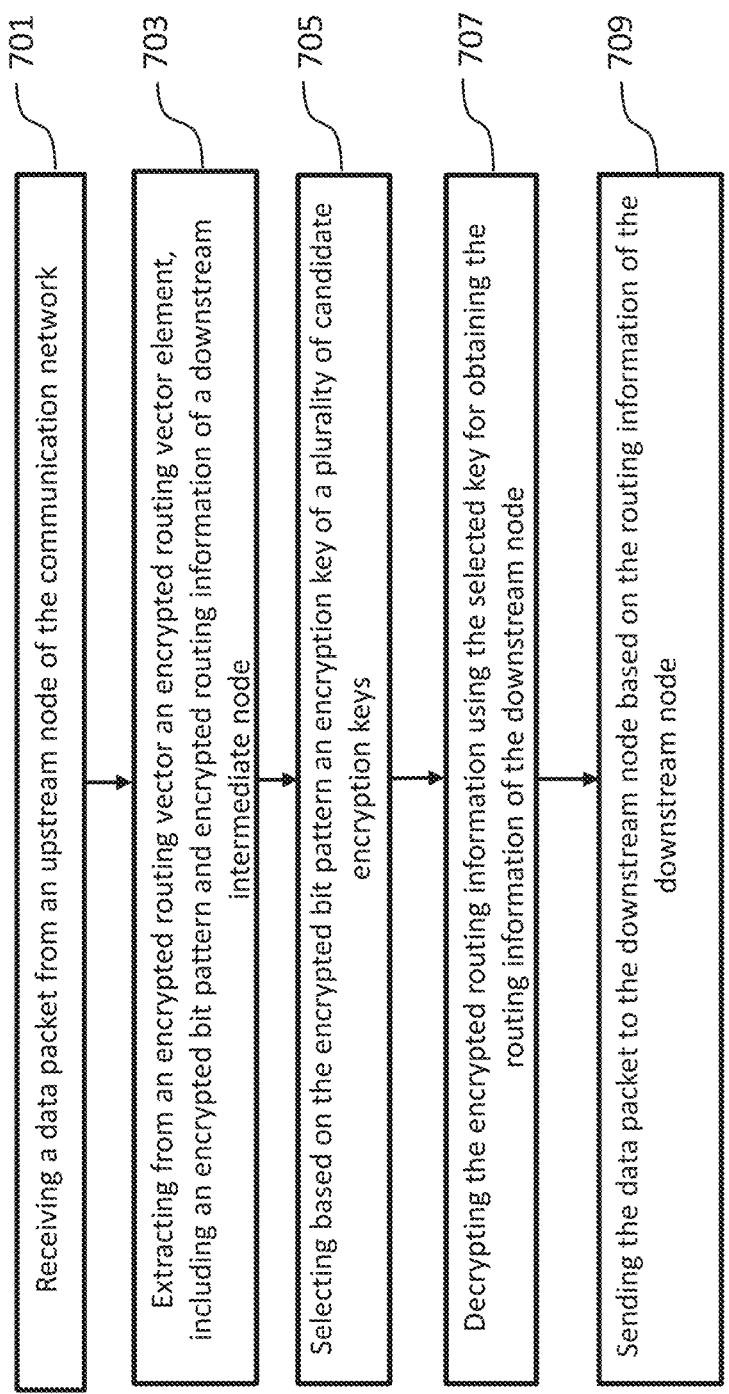
FIG. 7 is a flow diagram illustrating a method for routing a data packet according to an embodiment.

FIG. 7 is a flow diagram illustrating a method 700 for routing a data packet from a source node via an intermediate node to a destination node of a communication network according to an embodiment.

The method 700 comprises a step of receiving 701 the data packet from an upstream node of the communication network.

The method 700 further comprises a step of extracting 703 from an encrypted routing vector an encrypted routing vector element, including an encrypted bit pattern and encrypted routing information of a downstream node.

The method 700 further comprises a step of selecting 705 based on the encrypted bit pattern an encryption key of a plurality of candidate encryption keys.

The method 700 further comprises a step of decrypting 707 the encrypted routing information using the selected key for obtaining the routing information of the downstream node.

The method 700 further comprises a step of sending 709 the data packet to the downstream node based on the routing information of the downstream node.

The method 700 can be performed by one of the intermediate routing nodes 101a-c according to an embodiment. Thus, further features of the method 700 result directly from the functionality of the intermediate routing nodes 101a-c as well as their different embodiments described above and below.

Embodiments disclosed herein make use of a privacy-preserving routing element vector 107 to be used in the anonymous source routing communication network 100. The privacy of the information stored in the routing element vector 107 may be ensured by the fixed size of the vector 107 to prevent an external observer to determine the path's length. The in-vector location of each routing element 105a-c may be given by a pseudo-random permutation to prevent an observer from determining the position of a node on the path. A shared symmetric key may be used to encode the routing information elements. The shared symmetric key may be a one-time key derived from a master key to ensure packet flow unlinkability. The above described prepend, encrypt then cut and paste approach allows an intermediate node 101a-c processing the routing element vector 107 to have to rewrite the whole structure, thus making packet processing faster.

The person skilled in the art will understand that the "blocks" ("units") of the various figures (method and apparatus) represent or describe functionalities of embodiments of the present disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described embodiment of an apparatus is merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments disclosed herein may be integrated into one processing unit, or each of the units may exist alone physically, or two or more units are integrated into one unit.

What is claimed is:

1. A source node for transmitting a data packet to a destination node via one or more intermediate nodes, including a first intermediate node, in a communication network, wherein the source node comprises:

a processing circuitry configured to:
concatenate a first routing vector element including a first bit pattern agreed between the source node and the destination node with an initial routing vector comprising a bit string,
encrypt the concatenation of the first routing vector element and the initial routing vector using a selected first encryption key of a plurality of first candidate encryption keys,
replace a portion of the encrypted initial routing vector at a first position of the encrypted initial routing vector by the encrypted first routing vector element for obtaining a first modified routing vector,
concatenate a second routing vector element, including a second bit pattern agreed between the source node and the first intermediate node and routing information of the destination node, with the first modified routing vector,
encrypt the concatenation of the second routing vector element and the first modified routing vector using a selected second encryption key of a plurality of second candidate encryption keys, and
replace a portion of the encrypted first modified routing vector at a second position of the encrypted first modified routing vector by the encrypted second routing vector element for obtaining a second modified routing vector; and
a communication interface configured to transmit the data packet including the second modified routing vector towards the first intermediate node.

2. The source node of claim 1, wherein the first position of the encrypted initial routing vector and the second position of the encrypted first modified routing vector are random positions selected by the processing circuitry based on a pseudo-random permutation.

3. The source node of claim 1, wherein the initial routing vector is a random bit string of fixed length.

4. The source node of claim 1, wherein the second routing vector element further includes information about the first position of the encrypted first routing vector element within the first modified routing vector.

5. The source node of claim 1, wherein the data packet further comprises information about the second position of the encrypted second routing vector element within the second modified routing vector.

6. The source node of claim 1, wherein the processing circuitry is further configured to:
concatenate a third routing vector element, including a third bit pattern agreed between the source node and a second intermediate node) and routing information of the first intermediate node, with the second modified routing vector;
encrypt the concatenation of the third routing vector element and the second modified routing vector using a selected third encryption key of a plurality of third candidate encryption keys; and
replace a portion of the encrypted second modified routing vector at a third random position of the encrypted second modified routing vector by the encrypted third routing vector element for obtaining a third modified routing vector; and
wherein the communication interface is further configured to transmit the data packet including the third modified routing vector towards the second intermediate node of the one or more intermediate nodes.

7. The source node of claim 1, wherein the processing circuitry is configured to concatenate the first routing vector element with the initial routing vector by prepending the first routing vector element to the initial routing vector and/or wherein the processing circuitry is configured to concatenate the second routing vector element with the first modified routing vector by prepending the second routing vector element to the first modified routing vector.

8. The source node of claim 1, wherein the processing circuitry is further configured to encrypt a data packet payload using the selected first encryption key and to further encrypt the data packet payload using the selected second encryption key.

9. The source node of claim 1, wherein the processing circuitry is configured to use a symmetric key encryption scheme for encrypting and decrypting.

10. The source node of claim 9, wherein the symmetric key encryption scheme comprises a block cipher.

11. The source node of claim 9, wherein the symmetric key encryption scheme is based on an XOR operation.

12. The source node of claim 1, wherein the processing circuitry is configured to generate the first candidate encryption keys using a first key derivation scheme and the second candidate encryption keys using a second key derivation scheme.

13. The source node of claim 1, wherein the processing circuitry is further configured to determine the one or more intermediate nodes in the communication network using a source routing scheme.

14. A method for transmitting a data packet from a source node to a destination node via one or more intermediate nodes, including a first intermediate node, in a communication network, wherein the method comprises:
concatenating a first routing vector element including a first bit pattern agreed between the source node and the destination node with an initial routing vector comprising a bit string,
encrypting the concatenation of the first routing vector element and the initial routing vector using a selected first encryption key of a plurality of first candidate encryption keys,
replacing a portion of the encrypted initial routing vector at a first position of the encrypted initial routing vector by the encrypted first routing vector element for obtaining a first modified routing vector;
concatenating a second routing vector element, including a second bit pattern agreed between the source node and the first intermediate node and routing information of the destination node, with the first modified routing vector;
encrypting the concatenation of the second routing vector element and the first modified routing vector using a selected second encryption key of a plurality of second candidate encryption keys;
replacing a portion of the encrypted first modified routing vector at a second position of the encrypted first modified routing vector by the encrypted second routing vector element for obtaining a second modified routing vector; and
transmitting the data packet including the second modified routing vector towards the first intermediate node.

15. An intermediate node of a communication network for routing a data packet from a source node to a destination node, wherein the intermediate node comprises:
a communication interface configured to receive the data packet from an upstream node of the communication network; and
a processing circuitry configured to:
extract from an encrypted routing vector an encrypted routing vector element, including an encrypted bit pattern and encrypted routing information of a downstream node;
select based on the encrypted bit pattern an encryption key of a plurality of candidate encryption keys; and
decrypt the encrypted routing information using the selected encryption key for obtaining the routing information of the downstream node;
wherein the communication interface is further configured to send the data packet to the downstream node based on the routing information of the downstream node.

16. The intermediate node of claim 15, wherein the processing circuitry is configured to use a symmetric key encryption scheme for encrypting and decrypting.

17. The intermediate node of claim 16, wherein the symmetric key encryption scheme comprises a block cipher.

18. The intermediate node of claim 16, wherein the symmetric key encryption scheme is based on an XOR operation.

19. The intermediate node of claim 15, wherein the upstream node is the source node or a further intermediate node.

20. The intermediate node of claim 15, wherein the downstream node is the destination node or a further intermediate node.

* * * * *